2,856,384

LINEAR POLYESTERS FROM 4,4'-DICARB-ALKOXYTOLANES

Thomas M. Laakso and Delbert D. Reynolds, Rochester, N. Y., assignors to Eastman Kodak Company, Rochester, N. Y., a corporation of New Jersey No Drawing. Application November 24, 1953
Serial No. 394,198

3 Claims. (Cl. 260—75)

This invention relates to highly polymeric linear polyesters prepared by condensing esters of 4,4'-dicarboxytolane with a polymethylene glycol.

This invention also relates to interpolyesters prepared by employing a mixture of a 4,4'-dicarbalkoxytolane and another aliphatic or aromatic dibasic acid ester with a glycol or mixture of glycols.

It is an object of this invention to provide novel polyesters and interpolyesters as described herein. It is another object of this invention to provide a novel process as described herein for preparing valuable polyesters and interpolyesters. Other objects will become apparent hereinafter.

Highly polymeric esters of terephthalic acid and various glycols, for example, ethylene glycol, tetramethylene glycol, etc., are well known and have been used in the preparation of linear highly polymeric polyesters having properties including that of being capable of being formed into useful filaments, fibers, and the like, and having high melting points and a low degree of solubility in organic solvents. Linear polyesters prepared from other aromatic dicarboxylic acids have also been described.

We have now discovered that various of the lower alkyl esters of 4,4'-dicarboxytolane can be employed in the preparation of valuable linear polyesters including interpolyesters having certain unique properties.

According to our invention, polyesters are prepared by employing 4,4'-dicarboxytolane esters having the following general formula:

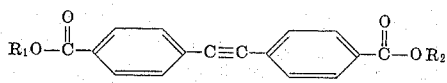

wherein $R_1$ and $R_2$ each represents an alkyl radical containing from 1 to 10 carbon atoms or an aryl radical of the benzene series containing from 6 to 9 carbon atoms.

Most advantageously, lower alkyl esters of 4,4'-dicarboxytolane wherein the alkyl radicals contain from 1 to 6 carbon atoms are employed in the preparation of the linear highly polymeric polyesters of this invention. The acid chloride instead of the esters can also be employed. Examples of esters which can be advantageously employed are those derived from methyl alcohol, isopropyl alcohol, n-butyl alcohol, sec.-butyl alcohol, n-amyl alcohol, tert.-butyl alcohol, hexyl alcohol, phenol, cresol, etc. It is advantageous to employ an alcohol or phenol having a boiling point well below the temperature at which the condensation to form the polyesters is carried out.

The new linear polyesters (including the interpolyesters) of this invention can be prepared having a softening point well above 200° C. and even higher than 300° C. Fibers, films, etc. of exceptional properties at high temperatures can be prepared from these new polyesters. These shaped products have exceptionally high tensile strength and elasticity. Fibers can be prepared so as to have softening points sufficiently far above 200° C. to give unusual ability to withstand ironing and pressing of fabrics made from these fibers. These fibers, films, etc. also show excellent resistance to most organic solvents, even at elevated temperatures. These novel polyesters can be extruded in the form of films or sheets which can be mechanically and heat treated so as to develop valuable properties as photographic film base material because of their excellent dimensional stability and resistance to swelling by water.

These novel polyesters may contain as substituents thereof small percentages of the 4,3'- and/or the 3,3'-isomers of the 4,4'-dicarboxytolane without substantial deleterious effect on the properties of the polyesters, especially when the highest possible melting or softening points are not necessarily desired.

The new polyesters of this invention can be processed to form fibers or films by melting spinning methods and can be extruded or drawn in the molten state to yield products which can be subsequently cold drawn to the extent of several hundred percent of their original lengths (or widths) whereby molecularly oriented structures of great strength and pliability can be obtained. As described in the examples set forth hereinbelow, the condensation product of the process as set forth in the various examples constitutes a highly viscous melt which is capable of being drawn into fibers and extruded into the form of film. Alternatively, the condensation product can be cooled and comminuted followed by subsequent remelting and processing to form fibers, photographic film, molded articles or other shaped products.

POLYESTERS FROM DICARBOXYTOLANE

One embodiment of our invention relates to a process for preparing a novel polyester which comprises (A) condensing a tolane compound having the formula:

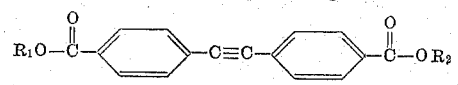

wherein $R_1$ and $R_2$ each represents a substituent selected from the group consisting of an alkyl radical containing from 1 to 6 carbon atoms, (B) with a dioxy compound selected from those compounds having the following formula:

$$R_3-O-(CH_2)_p-O-R_4$$

wherein $p$ represents a positive integer of from 5 to 10 when a single dioxy compound is employed and from 2 to 10 when more than one dioxy compound is employed, and $R_3$ and $R_4$ each represents a substituent selected from the group consisting of a hydrogen atom and an acyl radical containing from 2 to 4 carbon atoms, the dioxy compound being employed in such a proportion that there is at least an equivalent amount of oxy substituents in proportion to the carboxy substituents in the over-all combination of the tolane compound and the dioxy compound, (C) in the presence of an ester-interchange catalyst, (D) at an elevated temperature, (E) the condensation being conducted in an inert atmosphere, and (F) the later part of the condensation being conducted at a very low pressure of the inert atmosphere.

The dioxy compound is advantageously employed in such a proportion that there are from about 1.2 to 3 oxy substituents in proportion to the carboxy substituents in the overall combination of the tolane compound and the dioxy compound. Higher or lower proportions can also be employed.

Advantageously, the elevated temperature employed during the earlier part of the condensation is from about 200° C. to about 250° C. However, higher and lower temperatures can also be employed. The temperature depends upon the chain length of the glycol or glycols employed which affects the melting point of the polyester.

The earlier part of the condensation can advantageously be conducted for from approximately one to two hours in an inert atmosphere at temperatures of about 200°. Higher and lower temperatures can also be employed.

During the latter part of the condensation, the pressure can advantageously be greatly reduced to form a vacuum, i. e., a pressure of less than about 15 mm. of Hg and most advantageously of the order of less than about 5 mm. of Hg pressure. During the latter stage of the condensation reaction at the reduced pressure, the temperature can be advantageously increased and these conditions can be advantageously maintained for approximaterialy 1 to 5 hours. Temperatures of 250° to 300° C. can be advantageously employed during the second stage. Higher or lower temperatures can also be used.

Examples of inert atmospheres which can be employed advantageously include nitrogen, hydrogen, helium, etc.

The conditions under which the condensation can be conducted can be varied considerably depending upon the degree of polyesterification desired, the ultimate properties sought, the stability of the polyester being produced and the use for which the product is intended.

Most advantageously, the tolane compound employed in accordance with this invention is the methyl or ethyl diester of 4,4'-dicarboxytolane. Most advantageously, the dioxy compound employed in accordance with this invention is 1,5-pentanediol or 1,6-hexanediol.

Linear polyesters are also encompassed within the scope of this invention which are prepared by the condensation as described above employing a mixture of the above defined dioxy compounds. In addition to employing one or more of such dioxy compounds, one or more ether glycols can also be advantageously employed in a manner analogous to that described in Caldwell application Serial No. 313,067, filed October 3, 1952. The ether glycols can be represented by the following formula:

$$R_5-O-(R_7-O)_q-R_7-OR_6$$

wherein $R_7$ represents an alkylene radical containing from 2 to 4 carbon atoms, $q$ represents a positive integer of from 1 to 10 and $R_5$ and $R_6$ each represents a substituent selected from the group consisting of a hydrogen atom and an acyl radical containing from 2 to 4 carbon atoms. Examples of ether glycols which can be employed include diethylene glycol, tetraethylene glycol, bis(4-hydroxybutyl) ether, etc.

The sole use of the shorter chain (less than 5 carbon atoms) polymethylene glycols in unmodified polyesters results in the formation of polyesters having excessively high melting points resulting in some decomposition at or below the melting point. The employment of mixtures of glycols including the introduction of ether glycols results in the formation of polyesters having usefully melting points. Mixed glycols also result in the formation of products having a wider range of softening temperatures which is more advantageous in regard to extruding shaped products from the polyesters.

Some of the tolane compound employed in accordance with this invention can be replaced with another dibasic carboxy compound such as esters of oxalic acid, carbonic acid, aliphatic dibasic straight chain acids containing from 4 to 20 carbon atoms, aliphatic dibasic branched chain acids, aliphatic dibasic ether acids, aromatic dibasic acids, etc. The manner in which this partial substitution can be accomplished and corresponding polyesters produced is described hereinbelow. Examples of such additional dibasic acidic constituents include the lower alkyl esters of succinic acid, adipic acid, azelaic acid, 2-ethyl suberic acid 4-isopropyl sebacic acid, diglycollic acid, β-oxydipropionic acid, gamma-oxydibutyric acid, p,p'-sulfonyldibenzoic acid, terephthalic acid, 4,4'-dicarboxybenzophenone, etc.

The employment of a mixture of esters of dibasic acids generally results in some lowering of the softening and melting points of the resulting polyesters as well as resulting in the formation of a product having a wider range of softening temperatures. It also decreases the rate of crystallization of the polymer. These properties are advantageous in regard to the formation of extruded products. In fact, this reduction in the rate of crystallization makes these interpolyesters much more advantageously suited for the production of formed products such as photographic film where too rapid crystallization makes it practically impossible on a commercial or large scale basis to quench the hot formed product so as to avoid the inherently rapid crystallization of the unmodified polyesters. As described in greater detail hereinbelow, the various aromatic and certain aliphatic dibasic acid diesters are admirably suited to the production of especially advantageous interpolyesters having exceptionally valuable properties as regards the formation of extruded products such as photographic film.

The unmodified products of this invention are linear highly polymeric polyesters having melting points above about 200° C. when $p$ is less than 7, containing the following repeating unit:

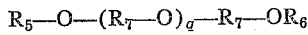

wherein $p$ is defined above. As indicated hereinbefore, these polyesters can also contain other repeating units derived from ether glycols and other dibasic acidic compounds. These polyesters are capable of being formed into fibers (such as by melt spinning methods) which can then be cold drawn by conventional means to from about 2 to 5 times their original spun length whereby these fibers develop strong, elastic, tough and otherwise highly valuable properties.

Catalytic condensing agents which can be advantageously employed in preparing these polyesters are ester-interchange catalysts which include those described in the prior art relating to the preparation of linear highly polymeric polyesters such as those derived from terephthalic acid diesters. These condensing agents include those selected from the group comprising the alkali metals, the alkaline earth metals, the oxides of these two groups of metals, the alkoxides containing from 1 to 8 carbon atoms of these two groups of metals, the carbonates and borates of these two groups of metals, lead oxide, cerium oxide, cobalt acetate, similar germanium and tin compounds and compounds having the following formulas:

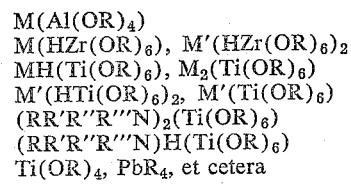

wherein M represents an alkali metal, M' represents an alkaline earth metal selected from the group consisting of magnesium, calcium and strontium, R represents an alkyl group containing from 1 to 6 carbon atoms, R', R" and R''' each represents a member of the group consisting of R and an aryl group of the benzene series containing from 6 to 9 carbon atoms.

Advantageously, from about 0.05% to about 0.2% of these catalysts based on the weight of the reactants being condensed can be employed. Higher or lower percentages can also be employed. Generally, from about 0.01 to about 0.06% of the catalytic condensing agent can be advantageously employed based on the weight of the materials being condensed.

The condensation reaction can be carried out in the presence or absence of a solvent. Inert, high boiling compounds, such as diphenyl, diphenyl ether, mixed tolyl sulfones, chlorinated naphthalene, chlorinated diphenyl, dimethylsulfolane, etc. can be used as the reaction medium. Most advantageously no solvent is employed.

It has been found that the type of catalyst employed in preparing the polyesters of this invention has an important bearing upon the qualities of the final product. Although most of the catalysts cited in the prior art can be used, it has been found that certain catalysts give superior results. Examples of catalysts which are especially efficacious are those which are set forth in the examples below and those which are described in applications Serial Nos. 313,072–313,078, filed October 3, 1952. Other efficacious catalysts are also described in recent publications and various patents.

It is important to exclude oxygen and moisture at all stages of the condensation reaction. The inert atmospheres described above are employed for accomplishing this result. Substantially anhydrous reactants can also be advantageously employed although this is not essential especially if any water is removed in the earlier stages of the condensation.

The preparation of 4,4'-dicarboxytolane diesters can be accomplished according to the following procedure:

*Example 1*

A. 4,4',α,β-TETRABROMO-α,β-DIPHENYLETHANE

A solution of 500 g. (2.7 mols) dibenzyl in 5.5 liters of glacial acetic acid and 266 cc. water containing 685 cc. bromine was refluxed until no more of the tetrabromo compound separated (approx. ½ hr.). The solid was filtered hot, washed with glacial acetic acid, then ether. The yield of light yellow to white crystals, M. P. 245–250° C. is 590 g. which is 40% of the theoretical value.

B. 4,4'-DICYANOSTILBENE

Two hundred grams (0.5 mol) 4,4'-tetrabromo-α,β-diphenylethane was mixed intimately with 224 g. cuprous cyanide and 225 cc. pyridine and refluxed in an electrically heated oil bath at 200–210° for 1½ hrs. More pyridine (480 cc.) was then added and the whole refluxed for 5 additional minutes and poured hot into 1200 cc. of warm conc. hydrochloric acid. The solid was filtered hot, washed with 400 cc. hot conc. hydrochloric acid and then water and dried at 100° C. about 95 g. of grey solid was obtained. Crystallization from nitrobenzene gave 63 g. M. P. 275–280° C. of almost pure yellow 4,4'-dicyanostilbene. This is about 56% of the theoretical value.

C. α,β-DIBROMO-4,4'-DICYANO-α,β-DIPHENYLETHANE

Forty-one grams (0.105 mol) of 4,4'-dicyanostilbene was dissolved in 250 cc. nitrobenzene at 200–210° C. A solution of 10 cc. bromine in 88 cc. nitrobenzene was run below the surface during 30 minutes in bright light. Absorption of the bromine was rapid with very little hydrogen bromide being liberated. The light colored product which crystallized on cooling was filtered and washed with nitrobenzene and ether. The yield of a α,β-dibromo-4,4'-dicyano-α,β-diphenylethane, M. P. 269° (decomp.) was 32 g. or 78% of the theoretical value.

D. 4,4'-DICYANOTOLANE

Thirty-two grams (0.081 mol) of α,β-dibromo-4,4'-dicyano-α,β-diphenylethane was suspended in a mixture of 575 cc. absolute ethyl alcohol and 10% methyl alcoholic potassium hydroxide and refluxed for two hours. The solid was filtered hot, washed with hot alcohol and then water. After recrystallization from glacial acetic acid, a 53.4% yield of 4,4' dicyanotolane M. P. 252–255° was obtained.

E. 4,4'-DICARBETHOXYTOLANE

Ten grams (0.044 mol) 4,4'-dicyanotolane was dissolved in 400 cc. nitrobenzene at 210° C. The solution was cooled to 50° C. and 50 cc. absolute alcohol was added. After chilling to 0° C., the solution was saturated with gaseous hydrogen chloride. The reaction solution was allowed to stand at room temperature for 48 hours. The light yellow crystalline solid precipitate was filtered and washed well with ether. The imino ether hydrochloride thus obtained was boiled with approximately three times its weight of water. The white solid formed was collected and recrystallized from absolute alcohol. The yield of white crystalline solid, M. P. 145°–147° C. was 62% of the theoretical value.

*Analysis.*—Calculated for $C_{20}H_{18}O_4$: C, 74.5; H, 5.6. Found: C, 73.9; H, 5.3.

Other lower alkyl esters of 4,4'-dicarboxytolane can be similarly prepared employing the corresponding alkyl homologs of the reactants used in the above example. Likewise, the aryl analogs can be employed to form the aryl esters. Any of these esters can be hydrolyzed by standard procedures to form the free acid 4,4'-dicarboxytolane. However, the esters of this acid are most advantageously employed in the preparation of polyesters.

The preparation of the polyesters of this invention can be further illustrated by the following examples. In addition to these examples, it is apparent that other variation and modifications thereof can be adapted to obtain similar results.

*Example 2.—Preparation of a polyester using 1,6-hexanediol*

Twenty grams of 4,4'-dicarbethoxytolane (.065 mole) was placed in a 200 cc. round-bottomed flask together with 18 g. (0.13 mole) 1,6-hexanediol. The flask was equipped with a 29/42 standard tapered glass female joint (35 mm. tubing) and a 15 mm. side arm 5 in. long extending from the neck. The flask was placed in an electrically heated silicone oil bath and a stream of dry nitrogen was bubbled through the flask to maintain an inert atmosphere. The clear melt was heated to 200° C. and 2.5 cc. of lithium aluminum alcoholate solution (1 g. in 100 cc. absolute alcohol) was added at once. The temperature was raised to 280° during the course of 2 hours. A glass ball-jointed stirrer having a 29/42 standard tapered male joint was inserted into the flask and a vacuum applied through the side arm. The pump was protected by means of Dry-Ice traps. With good stirring and a pressure of 0.2 mm. of Hg pressure or less the temperature was slowly raised to 290° C. At this temperature the polymer became so viscous that it could not be stirred (M. P. well above 310°). The flask was cooled at reduced pressure and the polymer removed. A slightly colored hard, high melting polymer was obtained. This polymer could be drawn into the form of fibers capable of cold-drawing. Films could also be extruded which could be subjected to planar orientation followed by heat setting.

*Example 3.—Preparation of a polyester using 1,9-nonanediol*

Eleven grams of 4,4'-dicarbethoxytolane (.034 mole) was placed in a 200 cc. round-bottomed flask together with 10.2 g. (0.068 mole) of 1,9-nonanediol. The flask was equipped with a 29/42 standard tapered female joint (35 mm. tubing) and a 15 mm. side arm 5 in. long extending from the neck. The flask was placed in an electrically heated silicone oil bath and a stream of dry nitrogen was bubbled through the flask to maintain an inert atmosphere. The clear melt was heated to 220° and 2.5 cc. lithium aluminum alcoholate solution (1 g. in 100 cc. absolute alcohol) was added at once. The temperature was raised to 270° during the course of 2 hours. A glass ball-jointed stirrer having a 29/42 standard tapered male joint was inserted into the flask and a vacuum applied through the side arm. The pump was protected by means of Dry-Ice traps. With good stirring and a pressure of 0.2 mm. of Hg or less and the temperature maintained at 270°, the polymer became in 15 minutes so viscous that it could not be stirred (M. P. above 300°). The flask was cooled at reduced pressure and the polymer removed. A yellow, hard, high melting polymer was obtained in good yield. Intrinsic viscosity of this polymer was 0.97 (25° C.) at a concentration of 0.25 g. per 100 cc. in a 60:40 mixture of phenol and tetrachloroethane. Useful fibers and films can be prepared from this polymer.

*Example 4.—Preparation of a polyester using 1,6-hexanediol*

Twenty grams of the dimethyl ester of 4,4'-dicarboxytolane (.065 mole) was placed in apparatus as described in Example 1 together with 18 g. (0.13 mole) 1,6-hexanediol. A stream of dry hydrogen was bubbled through the flask to maintain an inert atmosphere. The clear melt was heated to 185° C. and 2.5 cc. of potassium alcoholate solution (1 g. in 100 cc. absolute alcohol) was added at once. The temperature is raised to 275° C. during the course of 2 hours. Efficient stirring was continued and the pressure reduced to about 0.1 mm. of Hg while the temperature was slowly raised to 280° C. At this temperature the polymer became so viscous that it could not be stirred (M. P. well above 310°). The flask was cooled at reduced pressure and the polymer removed. A slightly yellowish colored hard, high melting polymer was obtained.

*Example 5.—Preparation of a polyester using 1,9-nonanediol*

Eleven grams of the n-propyl diester 4,4'-dicarboxytolane (.034 mole) was placed in apparatus as described in Example 1 together with 10.2 g. (0.068 mole) of 1,9-nonanediol. A stream of dry helium was bubbled through the flask to maintain an inert atmosphere. The clear melt was heated to 220° and 2.5 cc. sodium ethoxide solution (1 g. in 100 cc. absolute alcohol) was added at once. The temperature was raised to 275° C. during the course of 2½ hours. Efficient stirring was continued and the pressure reduced to about 0.5 mm. of Hg while the temperature was maintained at 275° C. In about 20 minutes the polymer became so viscous that it could not be stirred (M. P. above 300°). The flask was cooled at reduced pressure and the polymer removed. A yellowish, hard, high melting polymer was obtained in good yield. The intrinsic viscosity was 0.92 (25° C.) in 60:40 phenol:tetrachloroethane.

*Example 6.—Preparation of a polyester using 1,6-hexanediol*

Twenty grams of 4,4'-dicarbethoxytolane (.065 mole) was placed in apparatus as described in Example 1 together with 18 g. (0.13 mole) 1,6-hexanediol. A stream of dry nitrogen was bubbled through the flask to maintain an inert atmosphere. The clear melt was heated to 215° C. and 3.0 cc. of NaHTi(OC$_4$H$_9$)$_6$ solution (2.5 g. in 100 cc. n-butyl alcohol) was added at once. The temperature was raised to 260° C. during the course of 3 hours. Efficient stirring was maintained and the pressure reduced to about 0.5 mm. of Hg while the temperature was slowly raised to 290° C. At this temperature the polymer became so viscous that it could not be stirred (M. P. well above 310°). The flask was cooled at reduced pressure and the polymer removed. An off-colored hard, high melting polymer was obtained.

*Example 7.—Preparation of a polyester using 1,8-octanediol*

Eleven grams of 4,4'-dicarbethoxytolane (.034 mole) was placed in apparatus as described in Example 1 together with 9.3 g. (0.068 mole) of 1,8-octanediol. A stream of dry nitrogen was bubbled through the flask to maintain an inert atmosphere. The clear melt is heated to 215° C. and 4.0 cc. of NaH(Zr(OC$_4$H$_9$)$_6$) solution (5 g. in 100 cc. absolute alcohol) was added at once. The temperature was raised to 265° C. during the course of 3 hours. Efficient stirring was continued and the pressure reduced to about 0.6 mm. of Hg while the temperature was maintained at about 280° C. In about 20 minutes the polymer became so viscous that it could not be stirred (M. P. above 300°). The flask is cooled at reduced pressure and the polymer removed. A yellow, hard, high melting polymer was obtained in good yield.

*Example 8.—Polyester of 4,4'-dicarbethoxytolane with 1,7-heptanediol*

The condensation reaction described in Example 1 was repeated except that an equivalent amount of

$Na_2Ti(OC_4H_9)_6$ was employed as the catalyst and 0.13 mole of 1,7-heptanediol was used. See copending application Serial No. 313,072 for a description of this catalyst. The product obtained was essentially identical to that described in Example 1.

*Example 9.—Polyester of 4,4'-dicarbobutoxybenzanilide with 1,6-hexanediol*

The procedure described in Example 1 was repeated except that an equivalent amount of

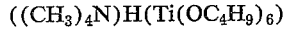
$((CH_3)_4N)H(Ti(OC_4H_9)_6)$ was employed as the catalyst. This catalyst is described in application Serial No. 313,075, filed on October 3, 1952. The product obtained was essentially the same as that described in Example 1.

Other esters of 4,4'-dicarboxytolane can be employed in lieu of the esters described in the preceding examples, e. g., the dibutyl esters, the dihexyl esters, etc. Modified polyesters can be employed using numerous other dibasic acid esters. Mixed glycols can also be employed wherein the glycols can include ether glycols as well as polymethylene glycols, e. g. diethylene glycol.

The products described in the above examples have been drawn, extruded, or otherwise formed, into various fibers, films, and other shaped and molded products having toughness, dimensional stability, high softening point, good elastic recovery from elongation, good work recovery, low stress-relaxation, and other useful properties.

INTERPOLYESTERS FROM ADMIXED AROMATIC ACIDS

Another embodiment of our invention as discussed above relates to a process for preparing novel interpolyesters which comprises (A) condensing about 10 mole proportions of a tolane compound having the formula

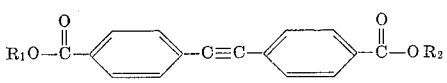

wherein $R_1$ and $R_2$ each represents a substituent selected from the group consisting of an alkyl radical containing from 1 to 6 carbon atoms, plus from about 1 to about 10 mole proportions of a lower alkyl diester, wherein the alkyl radicals contain from 1 to 6 carbon atoms, of an aromatic dibasic acid containing from 1 to 2 phenylene nuclei wherein each of the carbalkoxy radicals is attached to a phenylene nucleus in meta or para relationship to the other valence bond on the phenylene nucleus, said lower alkyl diester of said aromatic dibasic acid being capable of being condensed with hexamethylene glycol to form a polyester having a melting point above about 150° C., (B) with a dioxy compound selected from those compounds having the following formula:

$$R_3-O-(CH_2)_p-O-R_4$$

wherein $p$ represents a positive integer of from 2 to 10, inclusive, and $R_3$ and $R_4$ each represents a substituent selected from the group consisting of a hydrogen atom and an acyl radical containing from 2 to 4 carbon atoms, the dioxy compound being employed in such a proportion that there is at least an equivalent amount of oxy substituents in proportion to the carboxy substituents in the over-all combination of the tolane compound and the dioxy compound, (C) in the presence of an ester-interchange catalyst, (D) at an elevated temperature, (E) the condensation being conducted in an inert atmosphere, and (F) the latter part of the condensation being conducted at a very low pressure of the inert atmosphere.

The details of how this process can be conducted are the same as those described hereinbefore for the unmodified polyester except that a mixture of acid esters is employed.

We have found that the interpolyesters derived from mixed acid diesters which include these aromatic diesters are especially suited for the production of certain shaped products such as photographic film where the unmodified polyesters described above cannot be advantageously employed since they possess such a high rate of crystallization that it is virtually impossible on an industrial or large scale production basis to quench the hot shaped product so as to avoid the formation of a hard, brittle, crystalline end product. This is especially true when film with a thickness on the order of about 0.050 inch is extruded. In preparing many useful film products, it is necessary to make the originally extruded film considerably thicker than that which is eventually desired in order to take into account the lengthwise and sidewise stretching which is necessary in order to form an oriented structure.

It has been discovered that the particular interpolyesters just described avoid this difficulty. The products obtained can be quenched by ordinary readily workable means to produce shaped end-products having desirable physical characteristics including high molecular weights, melting points above about 150° C., etc. Most advantageously, these modified interpolyester products are prepared from selected mixed acid esters and a glycol whereby the end products will have melting points on the order of about 200° C. or higher. Films prepared from these interpolyesters by extrusion can be readily quenched and then stretched lengthwise and crosswise, followed by heat setting to form an oriented structure having excellent physical properties including tensile strength approaching 10,000 pounds per square inch or higher, an elongation at the breaking point of up to about 25 percent or more, a desirable swell-shrink amplitude, a high resistance to tearing or repeated folding, etc.

The products of this embodiment of the invention are linear highly polymeric interpolyesters having melting points above about 150° C. and which contain in the interpolyester configuration a ratio of about ten of the following tolane repeating units:

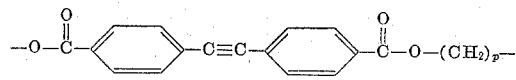

to each one to about 10 of a repeating unit derived by deleting the hydrogen atom from the left hand carboxyl radical and replacing the hydrogen atom of the right hand carboxyl radical with a $-(CH_2)_p-$ radical in the structural formula of an aromatic dibasic acid containing from 1 to 2 phenylene nuclei wherein each of the carboxy radicals is attached to a phenylene nucleus in a position selected from those consisting of the meta and para positions in relationship to the other valence bond on the phenylene nucleus, said interpolyester being capable of molecular orientation to form a shaped product having a tensile strength of at least 5000 pounds per square inch and a linear elongation of at least 10 percent.

Examples of dibasic aromatic acid diesters which can be employed in accordance with this embodiment of the invention include diesters of isophthalic acid, m,p'-sulfonyl dibenzoic acid, p,p'-diphenic acid, p,p'-dicarboxybenzophenone, bis (p-carboxyphenoxy)-1,4-n-butane, 1,4-di-(carboxymethyl)benzene, 4,4' - di(carboxymethyl)biphenyl, 1,4-di(carboxyethoxy)benzene, 4,4'-di(carboxyethoxy)biphenyl, bis (p-carboxyphenylmethyl) ether, 4,4'-dicarboxybenzanilide, terephthalic acid, etc.

The preparation of the interpolyesters described in this embodiment of our invention can be further illustrated by the following examples. In addition to the examples, it is apparent that other variations and modifications thereof can be adapted to obtain similar results.

The following examples each employ this general procedure:

The reactant esters and glycols were melted together with the ester interchange catalyst in a reaction vessel containing an atmosphere of nitrogen. Heat was supplied by means of an oil bath which was maintained at the temperature shown in each example during the course of the two stages of each reaction. The period of time during which the temperature was maintained for each stage is indicated for each example. At the end of the first stage of the condensation, a vacuum pump was connected to the reaction vessel and the reaction mixture was stirred under reduced pressure of less than about 5 mm. of Hg pressure. Stirring was maintained during the entire course of the reaction in each instance. The second stage differs from the first stage as regards the pressure and may also differ as to temperature. After the second stage was completed, the reaction vessel was removed from the heating bath and allowed to cool. The remarks set forth in each example describe the product obtained.

*Example 10.*—Polyester from dibutyl ester of p,p'-sulfonyldibenzoic acid and 4,4'-dicarbethoxytolane with 1,6-hexanediol Reactants: 4,4'-dicarbethoxytolane (193.5 g. or 90 mol percent), dibutyl ester of p,p'-sulfonyldibenzoic acid (28 g. or 10 mol percent), 1,6-hexanediol (140 g.)
Catalyst: 1 cc. NaHTi(OC$_4$H$_9$)$_6$ (the catalyst was prepared by adding 14.78 g. of Ti(OC$_4$H$_9$)$_4$ to a solution of 1 g. of Na in 100 cc. of n-butyl alcohol, after which the resulting solution was diluted to 200 cc.)
Temperature:
  I stage, 250° C.
  II stage, 275° C.
Time:
  I stage, 90 minutes
  II stage, 90 minutes (Hi Vac pump)
Remarks:
  (1) Product crystallized rapidly
  (2) Light color (yellowish)
  (3) Intrinsic viscosity in 60:40 phenol:s-tetrachloroethane, 0.75
  (4) Softened above about 250° C.

*Example 11.*—Polyester from dibutyl ester of p,p'-disulfonyldibenzoic acid and 4,4'-dicarbethoxytolane with 1,6-hexanediol Reactants: 4,4'-dicarbethoxytolane (671 g. or 80 mol percent), dibutyl ester of p,p'-disulfonyldibenzoic acid (217 g. or 20 mol percent), 1,6-hexanediol (440 g.)
Catalyst: 3 cc. NaHTi(OC$_4$H$_9$)$_6$ (see Example 10)
Temperature:
  I stage, 250° C.
  II stage, 280° C.
Time:
  I stage, 60 minutes
  II stage, 60 minutes (Hi Vac pump)
Remarks: (1) Crystallizes less rapidly than the product from Example 10

*Example 12.—Polyester from dibutyl ester of p,p'-sulfonyldibenzoic acid and 4,4'-dicarbethoxytolane with 1,6-hexanediol*

Reactants: 4,4'-dicarbethoxytolane (604 g. or 75 mol percent), dibutyl ester of p,p'-sulfonyldibenzoic acid (260 g. or 25 mol percent), 1,6-hexanediol (440 g.)
Catalyst: Dibutyl tin dibutoxide (see copending Caldwell application filed on October 3, 1952, Ser. No. 313,078)
Temperature:
I stage, 230° C.
II stage, 250° C.
Time:
I stage, 90 minutes
II stage, 2 hours (Hi Vac pump)
Remarks: (1) The rate of crystallization is sufficiently slow that the material can be easily extruded, quenched, and stretched to produce a sheet having very good physical properties

*Example 13.—Polyester from dibutyl ester of p,p'-sulfonyldibenzoic acid and 4,4'-dicarbethoxytolane with 1,6-hexanediol*

Reactants: 4,4'-dicarbethoxytolane (45 g. or 70 mol percent), dibutyl ester of p,p'-sulfonyldibenzoic acid (11.6 g. or 30 mol percent), 1,6-hexanediol (30 g.)
Catalyst: K(Al(OC$_2$H$_5$)$_4$)—see Caldwell application filed on October 3, 1952, Ser. No. 313,077
Temperature:
I stage, 250° C.
II stage, 270° C.
Time:
I stage, 60 minutes
II stage, 90 minutes
Remarks: (1) Crystallizes nicely

*Example 14.—Polyester from dimethyl terephthalate and 4,4'-dicarbethoxytolane with 1,6-hexanediol*

Reactants: 4,4'-dicarbethoxytolane (40.2 g. or 50 mol percent), dimethyl terephthalate (24 g. or 50 mol percent), 1,6-hexanediol (40 g.)
Catalyst: 0.2 cc. NaHTi(OC$_4$H$_9$)$_6$ (see Example 10)
Temperature:
I stage, 250° C.
II stage, 250° C.
Time:
I stage, 60 minutes
II stage, 75 minutes
Remarks: (1) Crystallizes very rapidly to a white porcelain-like product

*Example 15.—Polyester from dimethyl terephthalate and 4,4'-dicarbethoxytolane with 1,4-butanediol*

Reactants: 4,4'-dicarbethoxytolane (40.2 g. or 50 mol percent), dimethyl terephthalate (24 g. or 50 mol percent), 1,4-butanediol (50 g.)
Catalyst: 0.2 cc. NaHTi(OC$_4$H$_9$)$_6$ (see Example 10)
Temperature:
I stage, 250° C.
II stage, 250–260° C.
Time:
I stage, 60 minutes
II stage—30 minutes (250° C.), Hi Vac pump
90 minutes (260° C.), Hi Vac pump
Remarks:
(1) Crystallizes to a white porcelain-like material
(2) Can quench threads in air
(3) Intrinsic viscosity in 60:40 phenol:s-tetrachloroethane, 0.78
(4) Softens at about 250° C.

The following examples were performed under conditions similar to those described above. In Examples 16–19, inclusive, the reactants were mixed with the catalyst in a tube having a glass ground joint and equipped with a nitrogen inlet tube and a side tube. The reaction tube was placed in an oil bath heated at 270° C., and nitrogen was passed through the reaction mixture for one hour. The nitrogen inlet tube was sealed and a mechanical pump was attached to the side arm. The temperature was kept at 270° C. and the vacuum or second stage continued for one hour. The tube was removed from the bath and the polymer allowed to cool. In all cases, an increase in the proportion of the second component caused a decrease in melting point and a decrease in the rate of crystallization. In all cases, the polymers crystallized to hard, white-to-yellow materials. In each example, 0.5 cc. Ti(OC$_4$H$_9$)$_4$ was the catalyst. Polymers were prepared from the following components.

*Example 16*

3.4 g. 4,4'-dicarbethoxytolane (85 mol percent)
0.64 g. 4,4'-dicarbethoxybenzanilide (15 mol percent)
4 g. 1,6-hexanediol

*Example 17*

3.0 g. 4,4'-dicarbethoxytolane (75 mol percent)
1.1 g. 4,4'-dicarbethoxybenzanilide (25 mol percent)
4.0 g. 1,6-hexanediol

*Example 18*

3.4 g. 4,4'-dicarbethoxytolane (85 mol percent)
0.78 g. 4,4'-dicarbutoxydiphenylsulfone (15 mol percent)
4.0 g. 1,6-hexanediol

*Example 19*

3.0 g. 4,4'-dicarbethoxytolane (75 mol percent)
1.3 g. 4,4'-dicarbutoxydiphenylsulfone (25 mol percent)
4.0 g. 1,6-hexanediol

INTERPOLYESTERS FROM ADMIXED ALIPHATIC ACIDS

Another embodiment of our invention as discussed above relates to a process for preparing novel interpolyesters which comprises (A) condensing about 20 mole proportions of a tolane compound having the formula:

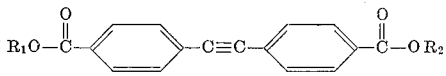

wherein R$_1$ and R$_2$ each represents a substituent selected from the group consisting of an alkyl radical containing from 1 to 6 carbon atoms, plus from about 1 to 6 mole proportions of a lower alkyl diester of an aliphatic acid having the formula:

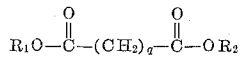

wherein R$_1$ and R$_2$ are each defined above and $q$ represents a positive integer of from 2 to 10 carbon atoms, (B) with a dioxy compound selected from those compounds having the following formula:

wherein $p$ represents a positive integer of from 2 to 10, inclusive and R$_3$ and R$_4$ each represents a substituent selected from the group consisting of a hydrogen atom and an acyl radical containing from 2 to 4 carbon atoms, the dioxy compound being employed in such a proportion that there is at least an equivalent amount of oxy substituents in proportion to the carboxy substituents in the overall combination of the tolane compound and the dioxy compound, (C) in the presence of an ester-interchange catalyst, (D) at an elevated temperature, (E) the condensation being conducted in an inert atmosphere, and (F) the latter part of the condensation being conducted at a very low pressure of the inert atmosphere.

The details of how this process can be conducted are the same as those described above for the unmodified polyester except that a mixture of acid esters is employed.

We have found that the interpolyesters derived from mixed acid diesters which include these aliphatic diesters are especially suited for the production of certain shaped products such as photographic film where the unmodified polyesters described above cannot be advantageously employed since they possess such a high rate of crystallization that it is virtually impossible on an industrial or large scale production basis to quench the hot shaped product so as to avoid the formation of a hard, brittle, crystalline end-product. This is especially true when film with a thickness on the order of about 0.050 inch is extruded. In preparing many useful film products it is necessary to make the originally extruded film considerably thicker than that which is eventually desired in order to take into account the lengthwise and sidewise stretching which is necessary in order to form an oriented structure.

It has been discovered that the particular interpolyesters just described avoid this difficulty. The products obtained can be quenched by ordinary readily workable means to produce shaped end products having desirable physical characteristics including high molecular weights, melting points above about 150° C., etc. Most advantageously, these modified interpolyester products are prepared from selected mixed acid esters and a glycol whereby the end products will have melting points on the order of about 200° C. or higher. Films prepared from these interpolyesters by extrusion can be readily quenched and then stretched lengthwise and crosswise, followed by heat setting to form an oriented structure having excellent physical properties including tensile strength approaching 10,000 pounds per square inch or higher, an elongation at the breaking point of up to about 25 percent or more, a desirable swell-shrink amplitude, a high resistance to tearing or repeated folding, etc.

The products of this embodiment of the invention are linear highly polymeric interpolyesters having melting points above about 150° C. and which contain in the interpolyester configuration a ratio of about 20 of the following tolane repeating units:

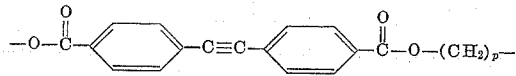

to each 1 to about 6 of a repeating unit having the following formula:

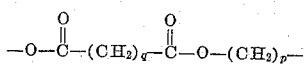

where p and q are defined hereinabove, all of said repeating units being connected by an ester linkage, said interpolyester being capable of molecular orientation to form a shaped product having a tensile strength of at least 5000 pounds per square inch and a linear elongation of at least 10 percent.

Examples of dibasic aliphatic acid diesters which can be employed in accordance with this embodiment of the invention include esters of succinic acid, glutaric acid, sebacic acid, azelaic acid, suberic acid, adipic acid, pimelic acid, etc.

The preparation of the interpolyesters described in this embodiment of our invention can be further illustrated by the following examples. In addition to the examples, it is apparent that other variations and modifications thereof can be adapted to obtain similar results.

The following examples each employ this general procedure: The reactant esters and glycols were melted together with the ester interchange catalyst in a reaction vessel containing an atmosphere of nitrogen. Heat was supplied by means of an oil bath which was maintained at the temperature shown in each example during the course of the two stages of each reaction. The period of time during which the temperature was maintained for each stage is also indicated for each example. At the end of the first stage of the condensation, a vacuum pump was connected to the reaction vessel and the reaction mixture was stirred under reduced pressure of less than about 5 mm. of Hg pressure. Stirring was maintained during the entire course of the reaction in each instance. The second stage differs from the first stage as regards the pressure and may also differ as to temperature. After the second stage was completed, the reaction vessel was removed from the heating bath and allowed to cool. The remarks set forth in each example describe the product obtained.

The catalyst employed in Examples 20— is

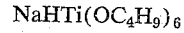

which was prepared by dissolving 1 g. Na in 200 cc. n-butyl alcohol and then adding 14.78 g. Ti(OC₄H₉)₄. The intrinsic viscosities were determined in a 60:40 mixture of phenol:tetrachloroethane.

*Example 20.—Polyester from diethyl succinate and 4,4'-dicarbethoxytolane with 1,6-hexanediol*

Reactants: 60.5 g. 4,4'-dicarbethoxytolane (75 mol percent) 10.9 g. diethyl succinate (25 mol percent) 40 g. 1,6-hexanediol
Catalyst: 0.5 cc. (see above)
Temperature:
　I stage, 250° C.
　II stage, 250° C.
Time:
　I stage, 50 minutes
　II stage, 95 minutes
Remarks:
　(1) Product crystallized to a white, porcelain-like material
　(2) Softened at about 250° C.

*Example 21.—Polyester from diethyl succinate and 4,4'-dicarbethoxytolane with 1,6-hexanediol*

Reactants: 68.5 g. 4,4'-dicarbethoxytolane (85 mol percent), 6.5 g. diethyl succinate (15 mol percent), 40 g. 1,6-hexanediol
Catalyst: 0.5 cc. (see above)
Temperature:
　I stage, 275°–285° C.
　II stage, 285°C.
Time:
　I stage, 40 minutes
　II stage, 85 minutes
Remarks: (1) Polymer crystallized to a porcelain-like white mass

*Example 22.—Polyester from diethyl succinate and 4,4'-dicarbethoxytolane with 1,6-hexanediol*

Reactants: 76.5 g. 4,4'-dicarbethoxytolane (95 mol percent), 2.2 g. diethyl succinate (5 mol percent), 40 g. 1,6-hexanediol
Catalyst: 0.5 cc. (see above)
Temperature:
　I stage, 275°–285° C.
　II stage 285° C.
Time:
　I stage, 40 minutes
　II stage, 65 minutes
Remarks: (1) Product was a white porcelain-like material

*Example 23.—Polyester from dimethylsebacate and 4,4'-dicarbethoxytolane with 1,6-hexanediol*

Reactants: 60.5 g. 4,4'dicarbethoxytolane (75 mol percent), 14.4 g. dimethylsebacate, 40 g. 1,6-hexanediol
Catalyst: 0.5 cc. (see above)
Temperature:
　I stage, 250–270° C.
　II stage, 280° C.
Time:
　I stage, 30 minutes
　II stage, 60 minutes
Remarks: (1) White crystalline polymer

*Example 24.—Polyester from dimethylsebacate and 4,4'-dicarbethoxytolane with 1,6-hexanediol*

Reactants: 68.5 g. 4,4'-dicarbethoxytolane (85 mol percent), 8.6 g. dimethylsebacate (15 mol percent), 40 g. 1,6-hexanediol
Catalyst: 0.5 cc. (see above)
Temperature:
  I stage, 260–270° C.
  II stage, 270° C.
Time:
  I stage, 30 minutes
  II stage, 60 minutes
Remarks:
  (1) White, crystalline polymer
  (2) Softened at about 250° C.

*Example 25.—Polyester from dimethylsebacate and 4,4'-dicarbethoxytolane with 1,6-hexanediol*

Reactants:
  76.5 g. 4,4'-dicarbethoxytolane
  2.9 g. dimethylsebacate
  40 g. 1,6-hexanediol
Catalyst: 0.5 cc.
Temperature:
  I stage, 250–260° C.
  II stage, 270° C.
Time:
  I stage, 30 minutes
  II stage, 60 minutes
Remarks:
  (1) White, crystalline polymer
  (2) Softened at about 275° C.

The interpolycarbonates described in the preceding examples all possess the property of slower crystallization as has been described hereinabove. It is readily obvious that other glycols and other modifying aliphatic dibasic acid diesters as well as different esters of 4,4'-dicarboxytolane can be employed in accordance with the procedures set forth in the preceding examples.

The following examples were performed under conditions similar to those described above. In Examples 26–29, inclusive, the reactants were mixed with the catalyst in a tube having a glass ground joint and equipped with a nitrogen inlet tube and a side tube. The reaction tube was placed in an oil bath heated at 270° C., and nitrogen was passed through the reaction mixture for one hour. The nitrogen inlet tube was sealed and a mechanical pump was attached to the side arm. The temperature was kept at 270° C. and the vacuum or second stage continued for one hour. The tube was removed from the bath and the polymer allowed to cool. In all cases, an increase in the proportion of the second component caused a decrease in melting point and a decrease in the rate of crystallization. In all cases, the polymers crystallized to hard, white-to-yellow materials. In each example, 0.5 cc. Ti(OC$_4$H$_9$)$_4$ was the catalyst. Polymers were prepared from the following components.

*Example 26*

3.4 g. 4,4-dicarbethoxytolane (85 mol percent)
0.32 g. diethylsuccinate (15 mol percent)
4.0 g. 1,6-hexanediol

*Example 27*

3.0 g. 4,4'-dicarbethoxytolane (75 mol percent)
0.54 g. diethyl succinate (25 mol percent)
4.0 g. 1,6-hexanediol

*Example 28*

3.4 g. 4,4'-dicarbethoxytolane (85 mol percent)
0.43 g. dimethyl sebacate (15 mol percent)
4.0 g. 1,6-hexanediol

*Example 29*

3.0 g. 4,4'-dicarbethoxytolane (75 mol percent)
0.72 g. dimethyl sebacate (25 mol percent)
4.0 g. 1,6-hexanediol Any of the processes described in this specification can be carried out in the solid phase as well as in the liquid phase as described. Moreover, continuous processes employing either phase can be advantageously employed. For example, the tolane compound, a glycol, and a catalyst can be introduced into the upper end of a large cylindrical reaction vessel equipped with an agitating means, provision for inert gas inlet and outlet, and a discharge outlet at the lower end of the vessel. Heat can be applied to such an apparatus until an initial charge has been carried through stage I of the condensation as described above. Then additional reactants and catalysts can be gradually introduced into the upper end as partially condensed product is gradually removed from the lower end of the apparatus. The partial condensate can then be introduced into similar apparatus provided with a means for maintaining a high vacuum until stage II is completed. Other continuous processes can also be adapted to the processes of this invention; U. S. 2,647,885 discloses such a process.

What we claim as our invention and desire to secure by Letters Patent of the United States is:

1. A linear highly polymeric interpolyester having a melting point above about 200° C. containing in the interpolyester configuration a ratio of about 20 of the following tolane repeating units:

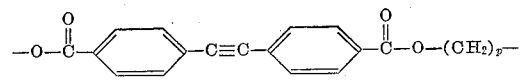

to each 1 to about 6 of a repeating unit having the following formula:

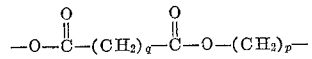

wherein $p$ and $q$ each represents a positive integer of from 2 to 10, said interpolyester being capable of melt extrusion to form film having a thickness on the order of about 0.050 inch which can be readily quenched in air and then stretched lengthwise and crosswise, followed by heat setting to form film having a tensile strength of about 10,000 pounds per square inch, an elongation at the breaking point of about 25% and low swell-shrink amplitude.

2. In a linear highly polymeric polyester having a melting point above about 200° C. containing in the interpolyester configuration at least about 20 of the following tolane repeating units:

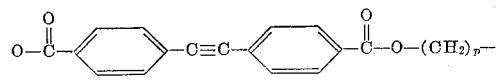

to each 1 to about 6 of the repeating units having the following formula:

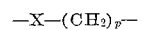

in which X is a bi-functional dicarboxylic radical selected from the group of (a)

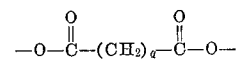

in which $q$ represents a positive integer of from 2 to 10 and (b) bi-functional dicarboxylic radicals containing from 1 to 2 phenylene nuclei in which each of the carboxyl radicals is attached to a phenylene nucleus in meta or para relationship to the other valence bond on the phenylene nucleus, and in which $p$ represents a positive integer from 2 to 10, said polyester being capable of molecular orientation to form a shaped product having a tensile strength of at least 5000 lbs. per square inch and a linear elongation of at least 10%.

3. In a linear highly polymeric polyester having a melting point above about 200° C. containing in the interpolyester configuration at least about 20 of the following tolane repeating units:

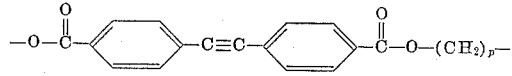

to each 1 to about 6 of the repeating units having the following formula:

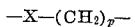

in which X is a bi-functional dicarboxylic compound containing from 1 to 2 phenylene nuclei in which each of the carboxyl radicals is attached to a phenylene nucleus in meta or para relationship to the other valence bond on the phenylene nucleus and in which $p$ represents a positive integer from 2 to 10, said polyester being capable of molecular orientation to form a shaped product having a tensile strength of at least 5000 lbs. per sq. inch and a linear elongation of at least 10%.

References Cited in the file of this patent

UNITED STATES PATENTS

| | | |
|---|---|---|
| 2,657,194 | Butler et al. | Oct. 27, 1953 |
| 2,657,195 | Toland | Oct. 27, 1953 |
| 2,686,739 | Kohl | Aug. 17, 1954 |
| 2,744,094 | Caldwell | May 1, 1956 |

OTHER REFERENCES

Johnson: The Chemistry of the Acetylenic Compounds, vol. II, 1950, pp. 258 and 260.